United States Patent
Chen et al.

(10) Patent No.: US 6,944,016 B2
(45) Date of Patent: Sep. 13, 2005

(54) MECHANISM FOR FASTENING AN ELECTRONIC DEVICE IN COMPUTER BY SNAPPING

(75) Inventors: Chang-Sheng Chen, Taipei (TW); Chun-Nan Li, Taipei (TW)

(73) Assignee: First International Computer, Inc., Taipei (TW)

( * ) Notice: Subject to any disclaimer, the term of this patent is extended or adjusted under 35 U.S.C. 154(b) by 241 days.

(21) Appl. No.: 10/638,384

(22) Filed: Aug. 12, 2003

(65) Prior Publication Data

US 2005/0035603 A1 Feb. 17, 2005

(51) Int. Cl.⁷ .................................................. G06F 1/16
(52) U.S. Cl. ...................... 361/685; 361/683; 361/724; 429/97; 292/163
(58) Field of Search ............................... 361/683, 684, 361/685, 724–727, 748, 732, 759, 747, 753; 312/333, 331.1, 319.1, 332.1; 292/19, 87, 91, 97, 163; 429/97; 403/53, 57, 59, 60, 322.4, 374.1, 326, 327; 108/109, 110

(56) References Cited

U.S. PATENT DOCUMENTS

| | | | | |
|---|---|---|---|---|
| 5,251,105 A | * | 10/1993 | Kobayashi et al. | 361/683 |
| 5,392,192 A | * | 2/1995 | Dunn et al. | 361/683 |
| 5,515,237 A | * | 5/1996 | Ogami et al. | 361/685 |
| 5,861,873 A | * | 1/1999 | Kikinis | 345/157 |
| 5,991,983 A | * | 11/1999 | Kohler et al. | 24/594.1 |
| 6,025,987 A | * | 2/2000 | Allirot et al. | 361/685 |
| 6,122,163 A | * | 9/2000 | Stone et al. | 361/685 |
| 6,122,173 A | * | 9/2000 | Felcman et al. | 361/726 |
| 6,606,241 B2 | * | 8/2003 | Moore | 361/685 |
| 6,672,787 B2 | * | 1/2004 | Tucker | 403/53 |
| 2001/0024355 A1 | * | 9/2001 | Lai et al. | 361/683 |

* cited by examiner

*Primary Examiner*—Michael Datskovskiy
(74) *Attorney, Agent, or Firm*—Bacon & Thomas PLLC

(57) ABSTRACT

The present invention is to provide a snapping mechanism mounted in a compartment of a case of a PC comprising a second hook of a pivotal member installed within the compartment for being pushed by a second protrusion of an electronic device, while mounting the electronic device into the compartment, the pivotal member moves along a trough provided thereon from one position to another position and enables an elastic member of the snapping mechanism to pivot the pivotal member like a lever to urge a first hook thereof against a first protrusion of the electronic device with the elastic member compressed and generate a strong snapping force to fasten the electronic device within the compartment.

5 Claims, 4 Drawing Sheets

MECHANISM FOR FASTENING AN ELECTRONIC DEVICE IN COMPUTER BY SNAPPING

FIELD OF THE INVENTION

The present invention relates to fastening mechanisms and more particularly to a mechanism for quickly fastening or unfastening an electronic device in a computer case by snapping.

BACKGROUND OF THE INVENTION

Currently, there are many kinds of mini personal computers (PCs) commercially available. The mini PC has advantages of being compact and as powerful as a conventional desktop computer. Thus, more and more people like to buy mini PCs. In general, a mini PC comprises a plurality of electronic devices such as a CD, a hard disk drive, a battery, etc.

It is very important to suitably customize narrow space inside the mini PC since the above electronic devices are mounted therein. Also, both assembly lines in the computer manufacturing factory and future component replacement and maintenance will be greatly beneficially or adversely affected by the well or poor arrangement of the electronic devices in the computer case. Typically, a plurality of screws are employed to fasten the electronic devices in respective frames in the case in installation.

However, the prior art of driving a plurality of screws to fasten the electronic devices in respective frames suffered from a number of disadvantages. For example, a replacement of one of the electronic devices is required if it is malfunctioned or an upgrade is performed. This replacement requires a user to disassemble the case and panels. Next, the user uses a screw driver to unfasten the screws secured to the frame and the electronic device. Finally, remove the electronic device. In another case of mounting a new electronic device in the frame, a user has to insert the electronic device into the frame. Next, drive a plurality of screws to fasten the electronic device in the frame. Finally, assemble the case and the panels together. This completes the installation of the new electronic device. This is very tedious and inconvenient in light of the narrow interior space of the case. Moreover, it is possible of damaging other electronic devices in the disassembly process if sufficient care is not taken.

In addition, speed will be decreased in the assembly lines in the computer manufacturing factory since the interior space of the case is narrow, resulting in an increase in the manufacturing cost. As such, the threaded fastening of the electronic devices in the frames not only prohibits the possibility of quickly fastening or unfastening an electronic device in the case of a mini PC, but also greatly increases the manufacturing cost.

In view of the above, assembly lines in the computer manufacturing factory and future component replacement, maintenance and upgrade are adversely affected by the threaded fastening of the electronic devices in the frames since it is tedious and inconvenient as well as it prohibits the possibility of quickly fastening or unfastening an electronic device in the case of a mini PC. Also, a sufficient care should be taken. Otherwise, it can damage other electronic devices in the disassembly process. This is very tedious to users. Thus, it is desirable to provide a novel mechanism for quickly fastening or unfastening an electronic device in computer case in order to overcome the above drawbacks of the prior art.

SUMMARY OF THE INVENTION

A primary object of the present invention is to provide a mechanism for fastening or unfastening an electronic device in the case of a PC (e.g., mini PC) by snapping. By utilizing the present invention, the above drawbacks of the prior art can be overcome. These drawbacks are that installation of an electronic device in a computer case or removal the same from the computer case is a tedious and inconvenient process since the interior space of the case in a mini PC is narrow and the threaded fastening of the electronic devices in frames of the computer case takes a lot of time. Moreover, a sufficient care should be taken in the disassembly process. Otherwise, it is susceptible of damaging other electronic devices.

One object of the present invention is to provide a simple and modular snapping mechanism in a computer case for greatly increasing computer production and thus reducing the manufacturing cost. The snapping mechanism is mounted in a compartment of the case. When a user mounts an electronic device in the compartment, a second protrusion of the electronic device pushes a second hook of a pivotal member for expanding an elastic member of the snapping mechanism. Next, a post moves from the other end of a trough to the other end at the bent portion thereof along a groove. At this time, the pivotal member will pivot similar to a lever enabling a first hook of the pivotal member to urge against a first protrusion of the electronic device with the elastic member compressed. This generates a strong snapping force to fasten the electronic device. The present invention not only makes the fastening or unfastening of the electronic device quick and simple but also substantially eliminates the prior drawback which involves a tedious, time consuming process in mounting the electronic device in the compartment or removing it from the compartment.

The above and other objects, features and advantages of the present invention will become apparent from the following detailed description taken with the accompanying drawings.

DETAILED DESCRIPTION OF THE PREFERRED EMBODIMENTS

Figure 1:
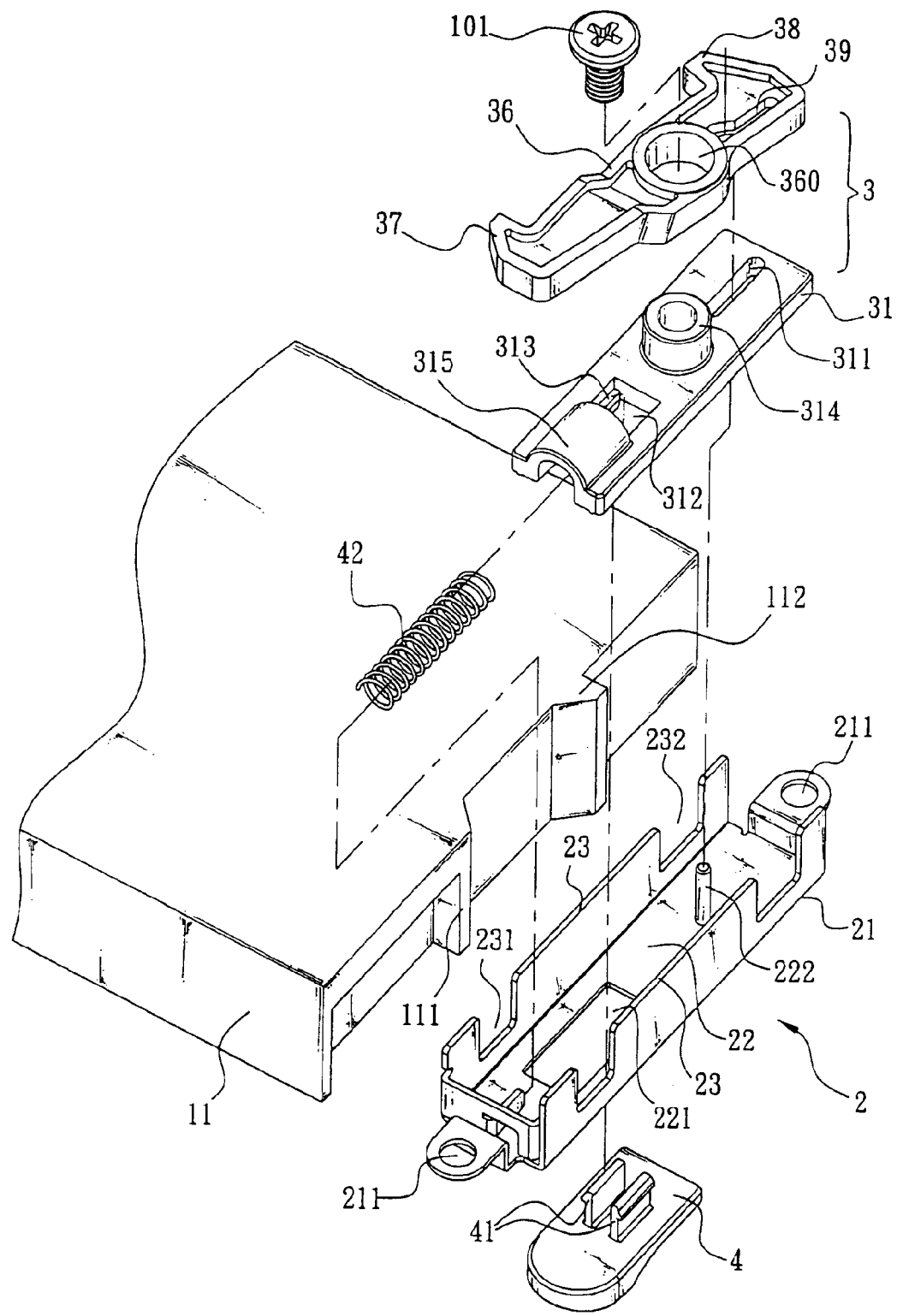
FIG. 1 is an exploded view of a preferred embodiment of snapping mechanism mounted in a computer according to the invention.
Figure 2:
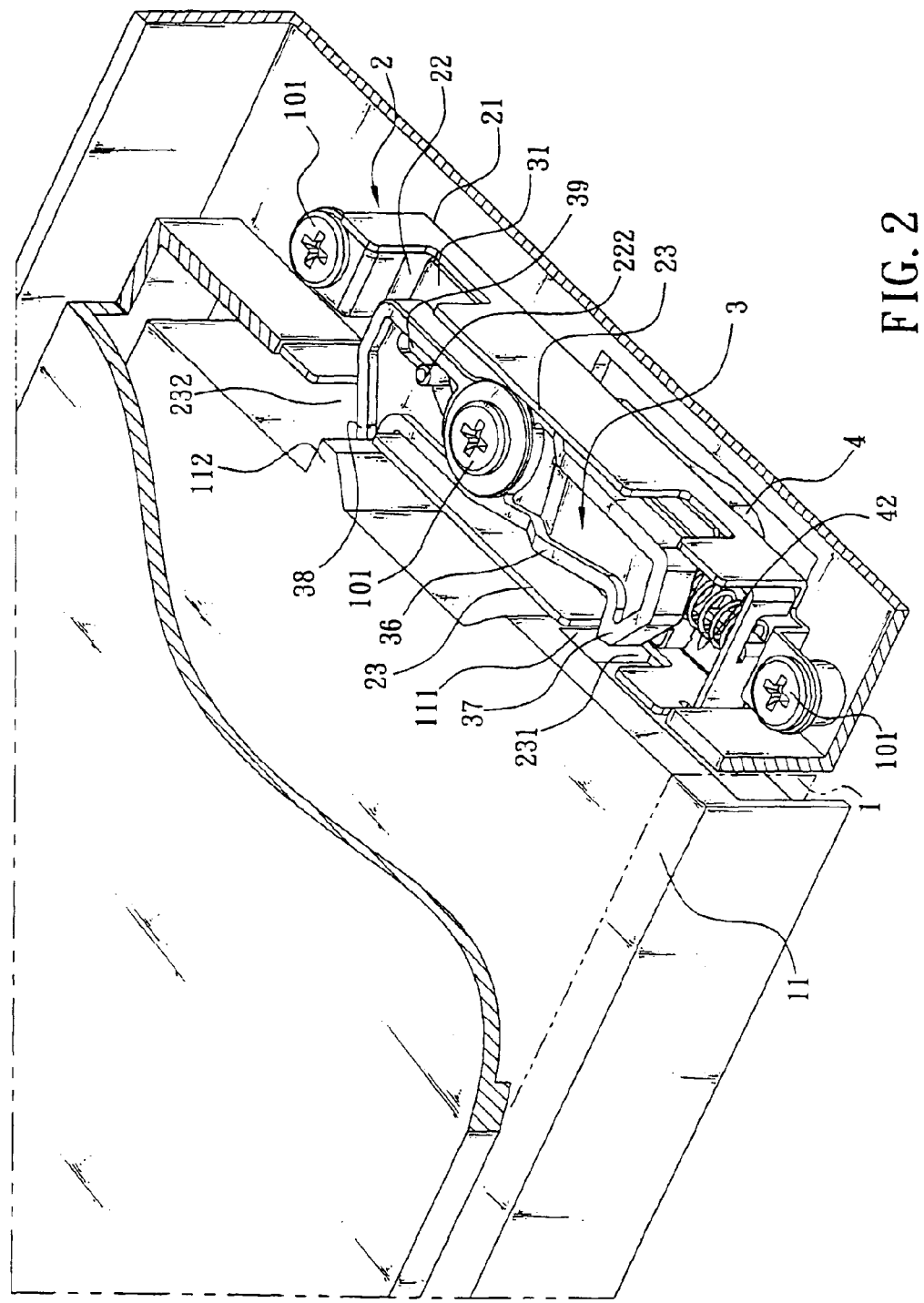
FIG. 2 is a perspective view of the mechanism.

Referring to FIGS. 1, 2, 3 and 4, there is shown a mechanism for fastening (or unfastening) an electronic device in the case of a computer (e.g., mini PC) by snapping in accordance with a preferred embodiment of the invention. The snapping mechanism 2 is mounted in a compartment 1 in the case (see FIG. 2). In detail, the mechanism 2 is mounted in a side of the compartment 1. An electronic device 11 (e.g., CD, hard disk drive, battery, etc.) is fitted in the compartment 1. Spaced first protrusion 111 and second protrusion 112 are formed on a side wall of the electronic device 11. The first and the second protrusions 111, 112 are disposed corresponding to the mechanism 2.

In the embodiment, the mechanism 2 comprises an elongate seat 21 including a bottom 22 and two vertical side plates 23 to cause the seat 21 to have a section of U (see FIG. 1). An opening 211 is formed at either end of the seat 21. Two screws 101 can be driven through the openings 211 to fasten the seat 21 at one side of the compartment 1 (see FIGS. 1 and 2). Moreover, a rectangular bottom opening 221 is formed on the bottom 22. A post 222 is also formed on the bottom 22. The post 222 is spaced apart from the bottom opening 221 by a predetermined distance. A first indentation 231 and a spaced second indentation 232 are formed at either side plate 23 of the seat 21. The first and the second indentations 231, 232 are disposed corresponding to the first and the second protrusion 111, 112 respectively.

In the embodiment, the mechanism 2 further comprises a moveable body 3 fitted on the bottom 22 of the seat 21. The moveable body 3 comprises a plate member 31 and a pivotal member 36 (see FIG. 1). The plate member 31 comprises a lengthwise groove 311, a rectangular recess 312 at one end, an annular flange 314 between the groove 311 and the recess 312, a latch 313 on either side of the recess 312, and an arc roof 315 on the recess 312. The pivotal member 36 comprises a first hook 37 at one end, a second hook 38 at the other end, an annular tunnel 360 between the first and the second hooks 37 and 38, and an elongate trough 39 between the second hook 38 and the tunnel 360. The trough 39 has a bent portion at one end. The tunnel 360 is put on the flange 314 for engaging the pivotal member 36 with the plate member 31. Further, a screw 101 is driven into the tunnel 360 to fasten the pivotal member 36 and the plate member 31 together for forming the moveable body 3. At this time, the trough 39 is above and partially aligned with the groove 311.

Figure 3:
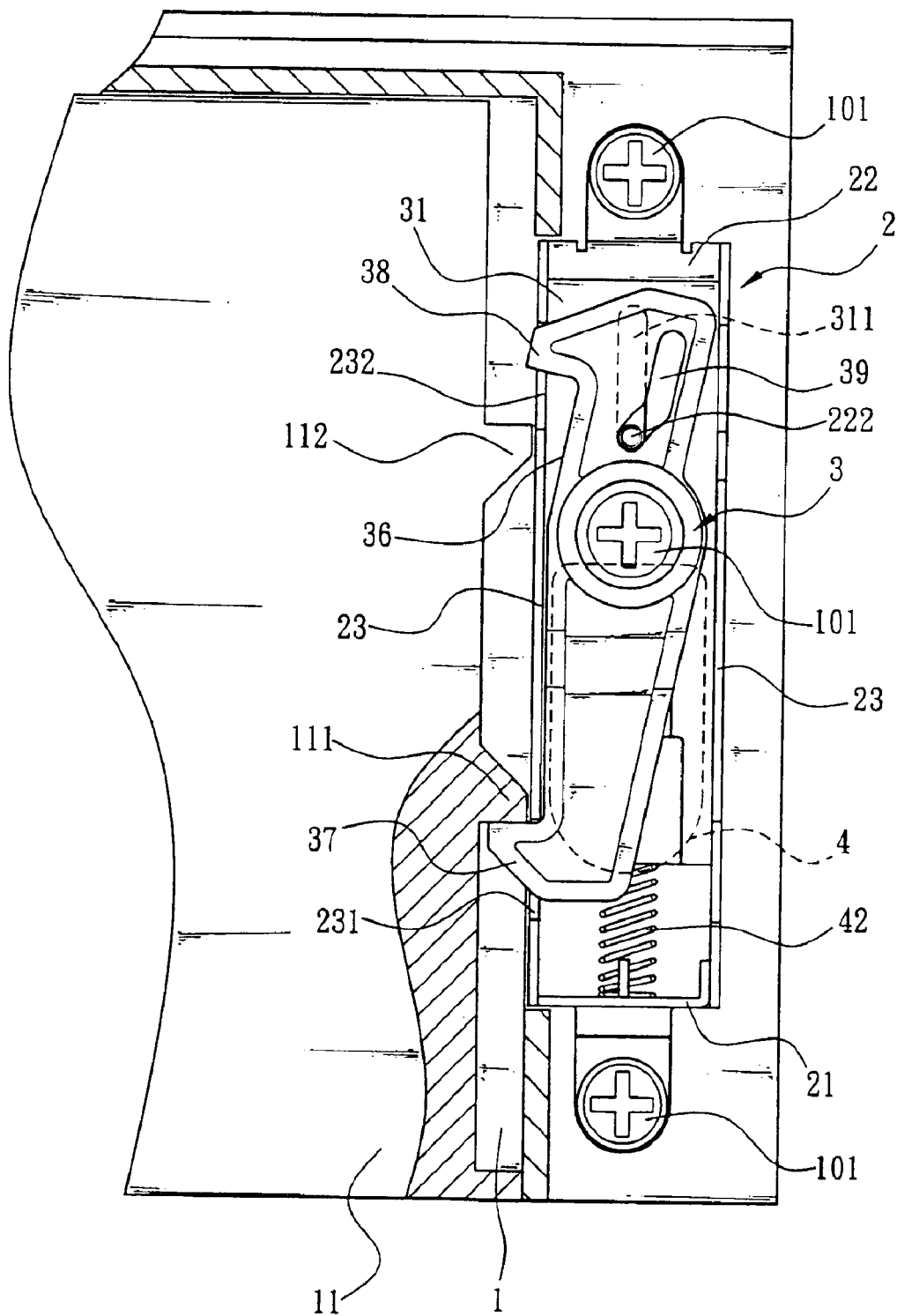
FIG. 3 is a top plan view in part section of the mechanism in a fastened state.
Figure 4:
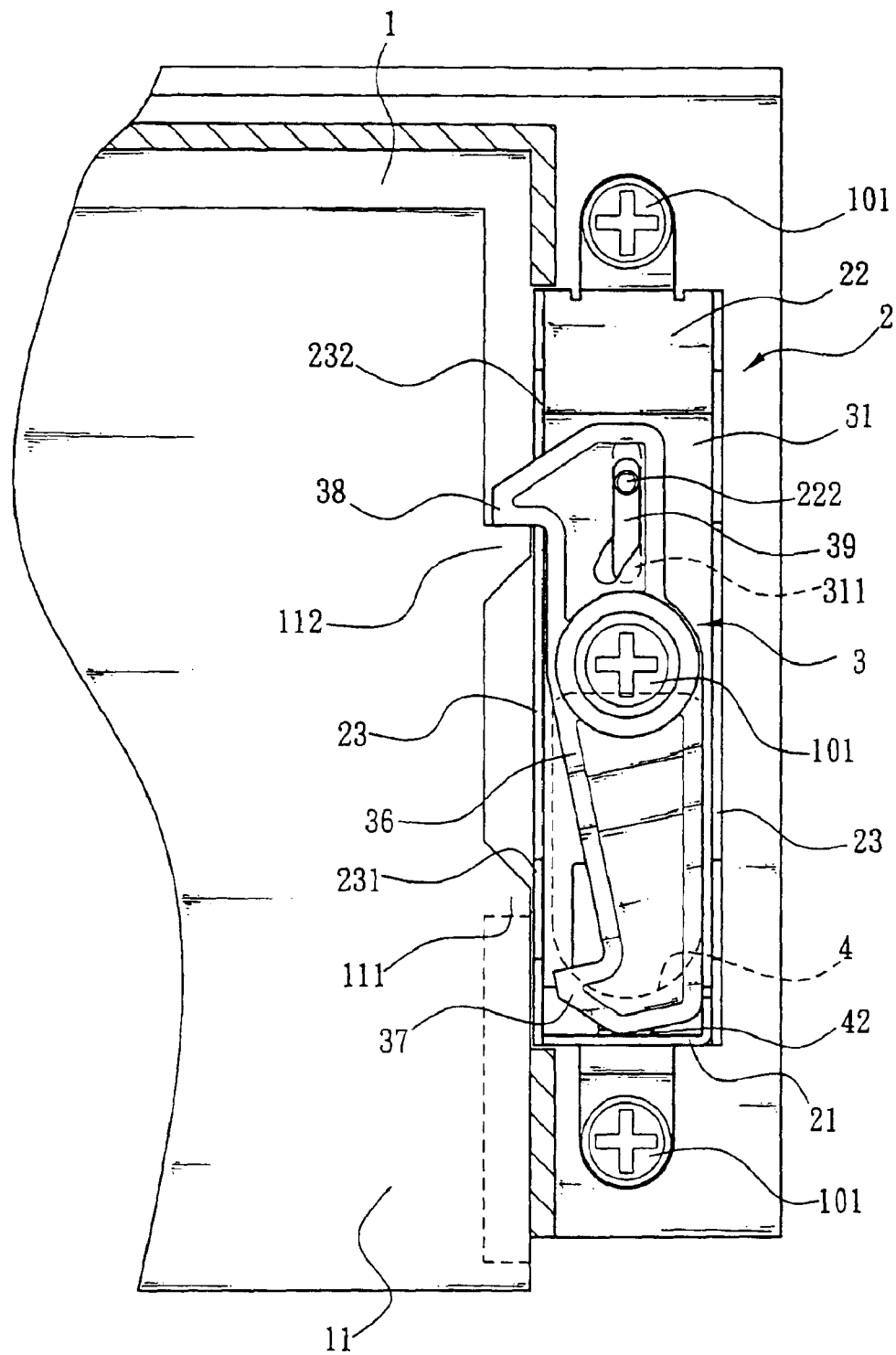
FIG. 4 is a view similar to FIG. 3 where the mechanism is unfastened for permitting an electronic device to remove from the case.

In the embodiment, in a case of the moveable body 3 mounted on the bottom 22 of the seat 21, the post 222 on the bottom 22 is inserted through the groove 311 and the trough 39 (see FIGS. 3 and 4). Also, the first and the second hooks 37, 38 of the pivotal member 36 are disposed corresponding to the first and the second indentations 231, 232 of the seat 21 respectively.

In the embodiment, as shown in FIG. 1 the mechanism 2 further comprises a plate-like sliding member 4 corresponding to the bottom opening 221 of the seat 21. The sliding member 4 comprises two upward latch arms 41 each having a bent, tapered end. The latch arms 41 can be inserted through the bottom opening 221 of the seat 21 into the recess 312 of the plate member 31 for securing to the side latches 313.

Moreover, as shown in FIGS. 1 to 4, an elastic member (e.g., spring) 42 is provided under the roof 315 and has one end put on a projected shaft opposite the opening 211 at one end of the seat 21 and the other end urged against the sides of the latch arms 41 of the sliding member 4 secured to the latches 313 at the sides of the recess 312 of the plate member 31. As such, a simple push of the sliding member 4 will compress the elastic member 42 for sliding the plate member 31. At the same time, the post 222 moves along lengthwise directions of the groove 311 and the trough 39 and thus causes the first and the second hooks 37, 38 of the pivotal member 36 to operate as a lever due to the bent portion at one end of the trough 39.

By configuring as above, in a case of mounting the electronic device 11 in the compartment 1 by a user, the second protrusion 112 of the electronic device 11 will push the second hook 38 first for expanding the elastic member 42. Next, the post 222 moves from the other end of the trough 39 to the other end at the bent portion thereof along the groove 311. At this time, the pivotal member 36 will pivot similar to the above lever. As such, the first hook 37 urges against the first protrusion 111 of the electronic device 11 with the elastic member 42 compressed (see FIG. 3). This generates a strong snapping force to fasten the electronic device 11. In a contrary operation, simply push the sliding member 4 to expand the elastic member 42 for causing the plate member 31 to move the post 222 from the other end at the bent portion of the trough 39 to the other end thereof along the groove 311. At this time, the elastic member 42 is compressed to generate a strong snapping force to urge the second hook 38 against the second protrusion 112. As a result, the electronic device 1 is unfastened to permit an automatic, partial removal of the electronic device 11 from the compartment 1 (see FIG. 4).

In brief, the snapping mechanism 2 of the invention is simple in construction and is modular for greatly increasing computer production and thus reducing the manufacturing cost. Moreover, the fastening or unfastening of the electronic device 11 is quick and simple, thereby substantially eliminating the prior drawback which involves a tedious, time consuming process in mounting the electronic device 11 in the compartment 1 or removing it from the compartment 1.

While the invention has been described by means of specific embodiments, numerous modifications and variations could be made thereto by those skilled in the art without departing from the scope and spirit of the invention set forth in the claims.

What is claimed is:

1. A mechanism for fastening an electronic device in a case of a computer, the case having a compartment for receiving the electronic device, the electronic device having a first protrusion and a spaced second protrusion on a side wall thereof, and the mechanism being disposed corresponding to the first and the second protrusions when mounted in a side of the compartment, and the mechanism comprising:

an elongate seat having a section of U, the seat comprising a bottom plate, two vertical side plates, a bottom opening on the bottom, a post on the bottom, the post being spaced apart from the bottom opening by a predetermined distance, and a first indentation and a spaced second indentation at either side plate, the first and the second indentations being disposed corresponding to the first and the second protrusion respectively;

a moveable body fitted on the bottom plate, the moveable body comprising a plate member including a lengthwise groove, a rectangular recess at one end, and an annular flange between the groove and the recess, and a pivotal member including a first hook at one end, a second hook at the other end, an annular tunnel between the first and the second hooks, and an elongate trough between the second hook and the tunnel, the trough having a bent portion at one end wherein the tunnel is put on the flange for engaging the pivotal member with the plate member for causing the trough to be disposed above and partially aligned with the groove, causing the first and the second hooks to be disposed corresponding to the first and the second indentations respectively, and inserting the post through the groove and the trough;

a sliding member inserted through the bottom opening to be disposed in the recess; and an elastic member disposed in the recess at one end of the plate member, the elastic member having has one end urged against one end of the seat and the other end urged against the sliding member at the recess, whereby pushing the sliding member will compress the elastic member for sliding the plate member, move the post along lengthwise directions of the groove and the trough, and cause the first and the second hooks to operate as a lever due to the bent portion at one end of the trough.

2. The mechanism of claim 1, further comprising a latch on either side of the recess, and wherein the sliding member comprises two upward latch arms each having a bent, tapered end so that the latch arms are adapted to insert through the bottom opening into the recess for securing to the latches.

3. The mechanism of claim 1, wherein a screw is driven into the tunnel to fasten the pivotal member and the plate member together for forming the moveable body.

4. The mechanism of claim 1, wherein the seat further comprises an opening at either end so that two screws are driven through the openings to fasten the seat at one side of the compartment.

5. The mechanism of claim 1, wherein the plate member further comprises an arc roof on the recess with the elastic member disposed under the roof.

* * * * *